United States Patent [19]

Yang

[11] Patent Number: 5,119,651
[45] Date of Patent: Jun. 9, 1992

[54] STEERING LOCK WITH IGNITION SWITCH BLOCKING MEANS

[76] Inventor: Wen-hsien Yang, No. 268 Chun Hsing St., Taipei Hsien, Taiwan

[21] Appl. No.: 698,324

[22] Filed: May 6, 1991

Related U.S. Application Data

[63] Continuation-in-part of Ser. No. 596,703, Oct. 10, 1990, abandoned.

[51] Int. Cl.⁵ .................... B60R 25/02; E05B 17/14; E05B 67/00
[52] U.S. Cl. ............................................ 70/52; 70/53; 70/209; 70/226; 70/238; 70/428; 70/455
[58] Field of Search ................. 70/209, 211, 212, 225, 70/226, 237, 238, 455, 423, 424, 426, 428, 18, 52, 53

[56] References Cited

U.S. PATENT DOCUMENTS

| | | | |
|---|---|---|---|
| 1,421,401 | 7/1922 | Byers | 70/212 |
| 1,462,725 | 7/1923 | Cooper | 70/120 X |
| 3,457,745 | 7/1969 | Barber | 70/424 |
| 4,008,590 | 2/1977 | Berkowitz et al. | 70/424 |
| 4,699,238 | 10/1987 | Tamir | 70/238 X |
| 4,974,433 | 12/1990 | Wang | 70/237 X |
| 5,007,259 | 4/1991 | Mellard | 70/209 |

FOREIGN PATENT DOCUMENTS 513332 11/1930 Fed. Rep. of Germany ........ 70/211

*Primary Examiner*—Lloyd A. Gall
*Attorney, Agent, or Firm*—Bacon & Thomas

[57] ABSTRACT

A steering lock with a lock body having an attached extensible member for adjusting the distance between two locking rods which are connected in parallel through a telescopic tube to form a shackle. The shackle can be extended when clearance is required, and is coupled with a pair of hook-shaped fastening rods which are connected in parallel through another telescopic tube for fastening to the steering wheel. When a lock barrel of the lock body is rotated to a locking position, the first and second latches inside the lock body lock up the locking bars and the extensible member. Two protective cover boards are bilaterally attached to the lock body to prevent insertion of a tool to cut the second latch and prevent injury to fingers during the locking and unlocking operation.

10 Claims, 9 Drawing Sheets

STEERING LOCK WITH IGNITION SWITCH BLOCKING MEANS

BACKGROUND OF THE INVENTION

The present invention is a continuation-in-part of U.S. patent application Ser. No. 07/596,703, which was filed on Oct. 10, 1990, and now abandoned.

The present invention provides an improvement which permits the two locking bars as well as the two fastening rods to be linked up with the telescopic tube so that the respective pitch can be conveniently adjusted and set into position.

A steering lock may include a device for locking up a vehicle steering wheel with the clutch pedal, accelerator pedal or brake pedal. There are various types of steering locks commonly used for locking up the steering wheel but the use of which have not been satisfactory. One disadvantage of the conventional steering locks is that their fixed structure occupies much space for storage. Another disadvantage is that a steering lock must be locked between the steering wheel and a pedal and it tends to damage or deform the steering wheel or pedal

SUMMARY OF THE INVENTION

The present invention has been accomplished to eliminate the afore-said problems. It is one object of the present invention to provide a car steering lock which can lock the steering wheel and simultaneously block up the ignition switch.

It is another object of the present invention to provide a car steering lock which is collapsible to reduce space occupation when not in use.

It is still another object of the present invention to provide a car steering lock which can fit any model of car to conveniently block up any raised or recessed structure of an ignition switch.

It is still another object of the present invention to provide a car steering lock which has guard means to protect the fingers of a user from injury during locking operation and to protect against insertion of a tool to damage the structure.

It is still another object of the present invention to provide a car steering lock which can be conveniently adjusted according to a desired shackle clearance for secure locking on any type of steering post.

It is yet a further object of the present invention to provide a car steering lock which is practical in use and easy to operate.

To achieve the above objects, the invention provides a car steering lock with a lock body having a shackle adjustably fastened therein. The shackle can be extended when clearance is required, and is comprised of a pair of locking bars, which are connected in parallel through a telescopic tube, coupled with a pair of hook-shaped fastening rods, which are also connected in parallel through another telescopic tube. The width between the two locking bars can be adjusted by an extensible member through a latch. When the steering lock is attached to the steering wheel of a car and the lock barrel of the lock body is rotated to a locking position, the first and second latches inside the lock body lock up the respective locking bars, permitting the hook-shaped fastening rods to firmly retain the steering wheel and the button or slot of the lock body to tightly block up the ignition switch. Protective cover boards are attached to the lock body to protect from insertion of a tool in cutting the second latch and prevent injury to fingers during locking and unlocking operation.

BRIEF DESCRIPTION OF THE DRAWINGS

The present invention will now be described by way of examples with reference to the annexed drawings, in which.

DETAILED DESCRIPTION OF THE PREFERRED EMBODIMENTS

Figure 1:
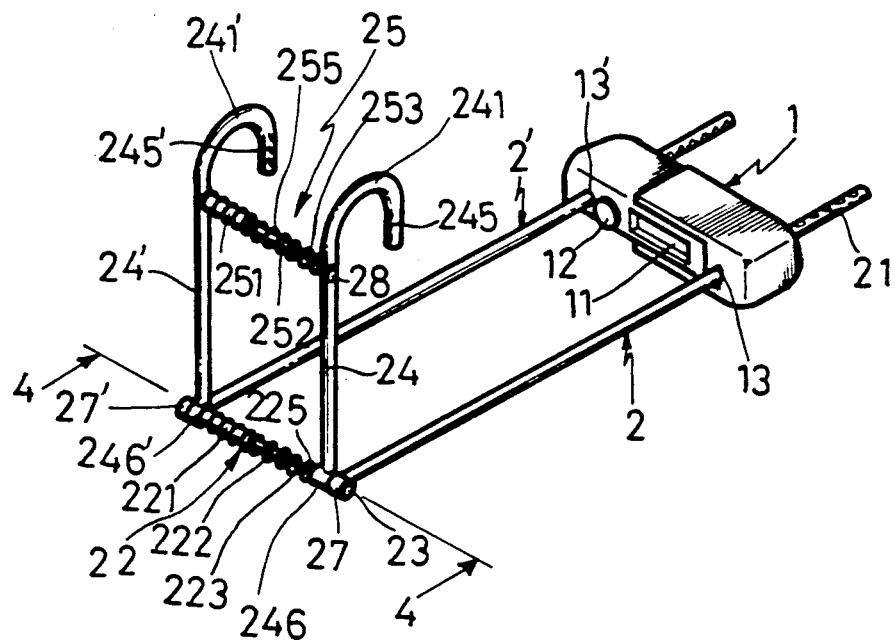
FIG. 1 illustrates a first preferred embodiment of a car steering lock of the present invention.
Figure 2:
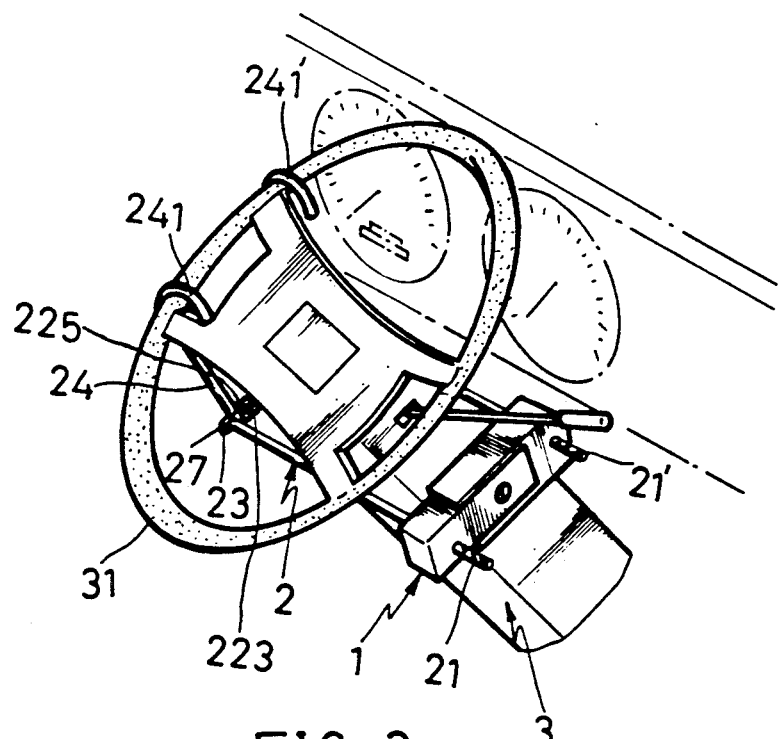
FIG. 2 illustrates the use of the first preferred embodiment of the car steering lock of the present invention in locking up a car steering wheel.

Referring to FIGS. 1 and 2, a lock body 1 comprises a slot 11 and a button 12 at one side for alternatively, blocking up the raised or recessed type of ignition switch. Two transverse holes 13, 13' are bilaterally formed on the lock body 1 for insertion therein of a pair of locking bars 2, 2'. The locking bars 2, 2' are connected in parallel by a telescopic tube 22, which is comprised of three or more sections 221, 222, 223, that slide one inside another, and have each a plurality of notches 21 at one end for adjusting shackle clearance. A linked pair of fastening rods 24, 24' are movably attached to the locking bars 2, 2' by two pins 23, 23' at an end opposite to the lock body 1 and connected in parallel by a telescopic tube 25 of same size as the telescopic tube 22 and have each a hooked end 241 or 241' for fastening to the steering wheel of a car.

Figure 3:
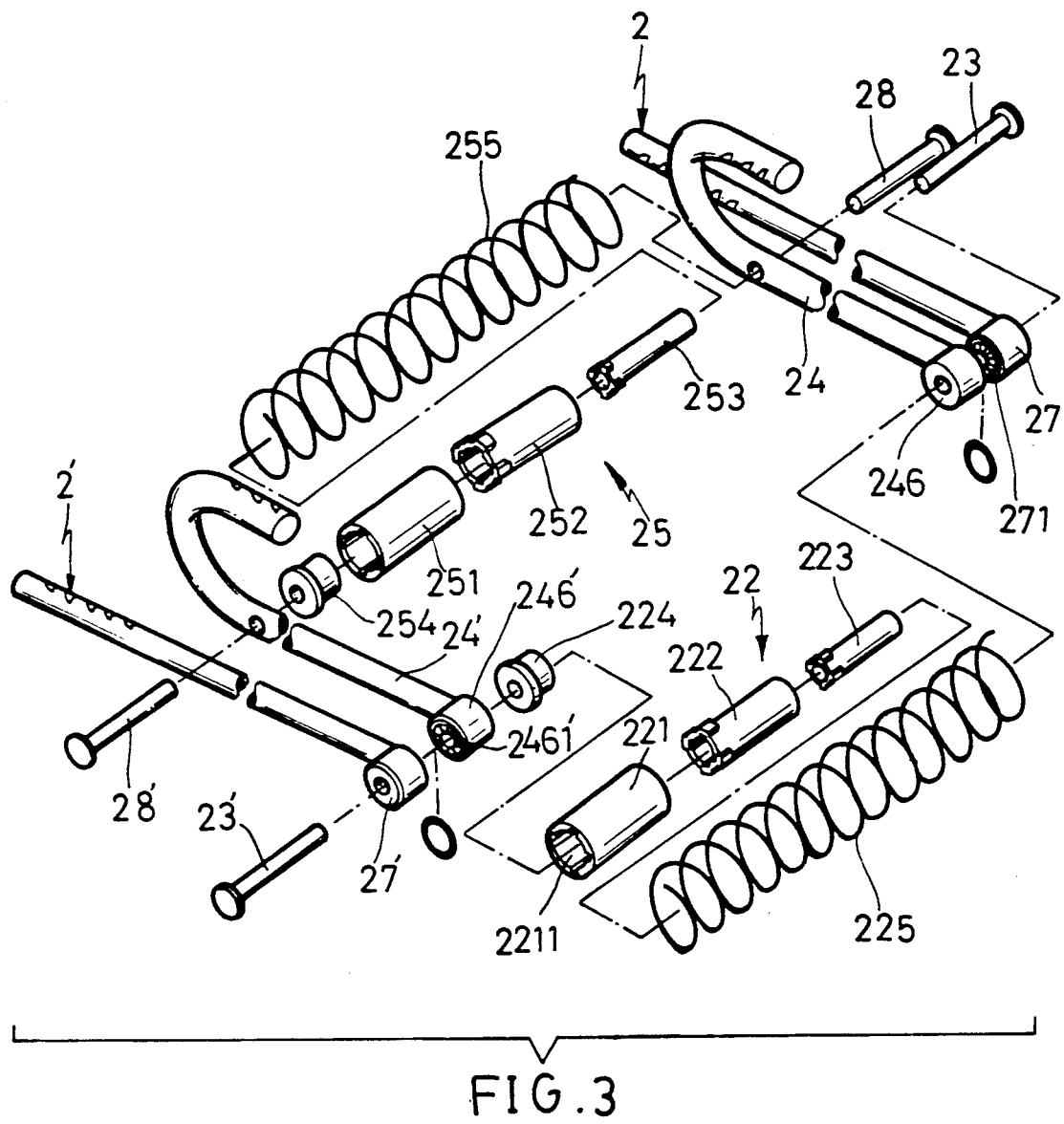
FIG. 3 is an exploded view of the first preferred embodiment of car steering lock of the present invention.
Figure 3A:
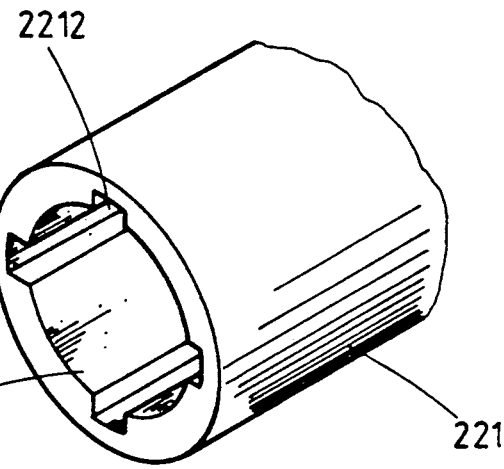
FIG. 3a is a partial perspective view of the first section of the telescopic tube in an enlarged scale.
Figure 3B:
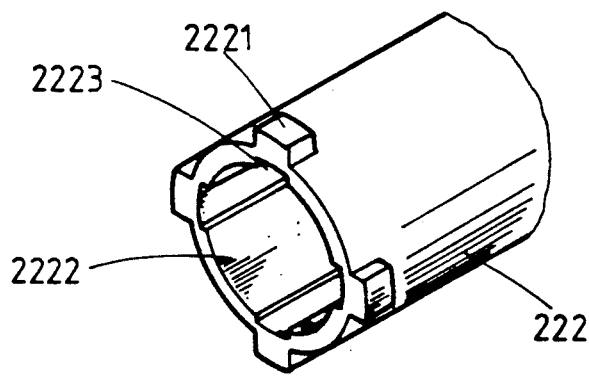
FIG. 3b is a partial perspective view of the second section of the telescopic tube in an enlarged scale.
Figure 3C:
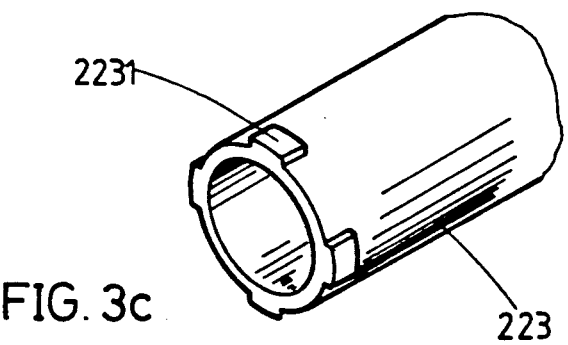
FIG. 3c is a partial perspective view of the third section of the telescopic tube in an enlarged scale.
Figure 4:
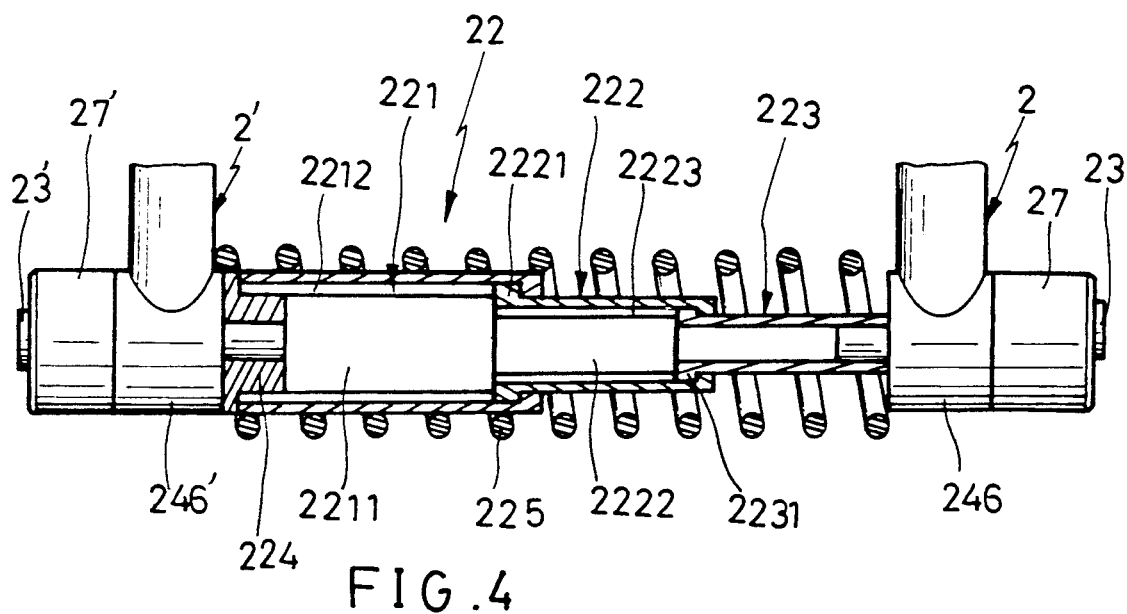
FIG. 4 is a sectional view taken along line 4—4 on FIG. 1.

Referring to FIGS. 1 and 3, the locking bars 2 and 2' and the fastening rods 24 and 24' each have a connection 27, 27', 246 or 246' at one end. By inserting the two pins 23 and 23' through the connection 27 or 27' of either locking bar 2 or 2' and the connection 246 or 246' of either fastening rod 24 or 24' into the telescopic tube 22, the fastening rods 24 and 24', the locking bars 2 and 2' and the telescopic tube 22 are respectively connected together and, the fastening rods 24 and 24' are permitted to be rotated relative to the locking bars 2 and 2'. Further, the connections 27, 27', 246 and 246' have each a toothed portion 271, 271', 2461 or 2461 at one side (271' and 2461 are not shown). By engaging the toothed portions 271 and 271' on the connections 27 and 27' of the locking bars 2 and 2' with the toothed portions 2461 and 2461' on the connections 246 and 246' of the fastening rods 24 and 24', the fastening rods 24 and 24' are firmly retained to the locking bars 2 and 2' and prevented from rotary motion. Referring to FIGS. 3, 3a, 3b, 3c and 4, the telescopic tube 22 is comprised of three or more sections 221, 222, 223 namely, a first section 221, an intermediate section 222 and a last section 223 that slide one inside another. The first section 221 has a ring-shaped insert 224 set in a boring bore 2211 therein at one end for fastening the pin 23', which boring bore 2211 has a plurality of sliding grooves 2212 longitudinally formed on the inner wall surface thereof. The intermediate section 222 has a plurality of guide blocks 2221 disposed around the outer wall surface thereof and respectively engaged in the sliding grooves 2212 on the inner wall surface of the first section 221, and a plurality of sliding grooves 2223 on the inner wall surface of the boring bore 2222 thereof. The last section 223 has a plurality of guide blocks 2231 disposed around the outer wall surface thereof and respectively engaged in the sliding grooves 2223 on the boring bore 2222 of the intermediate section 222. Therefore, the total length of the telescopic tube 22 can be conveniently adjusted by sliding the guide blocks 2231 and 2221 in the sliding grooves 2212 and 2223. Further, a compression spring 225 is sleeved on the telescopic tube 22, having two opposite ends respectively stopped against the two fastening rods 24 and 24' to constantly urge the two fastening rods 24 and 24' to move apart. The other telescopic tube 25 is secured to and between the two fastening rods 24 and 24' by two pins 28 and 28' at an opposite end. Similar to the first telescopic tube 22, the first section 251 of the second telescopic tube 25 has a ring-shaped insert set in the boring bore therein at one end. A compression spring 255, in size equal to the compression spring 225 for the first telescopic tube 22, is sleeved on the second telescopic tube 25 with the two opposite ends thereof respectively stopped against the two fastening rods 24 and 24'. By means of the two telescopic tubes 22 and 25, the distance between the two fastening rods 24 and 24' as well and the two locking bars 2 and 2' can be simultaneously adjusted.

Figure 5:
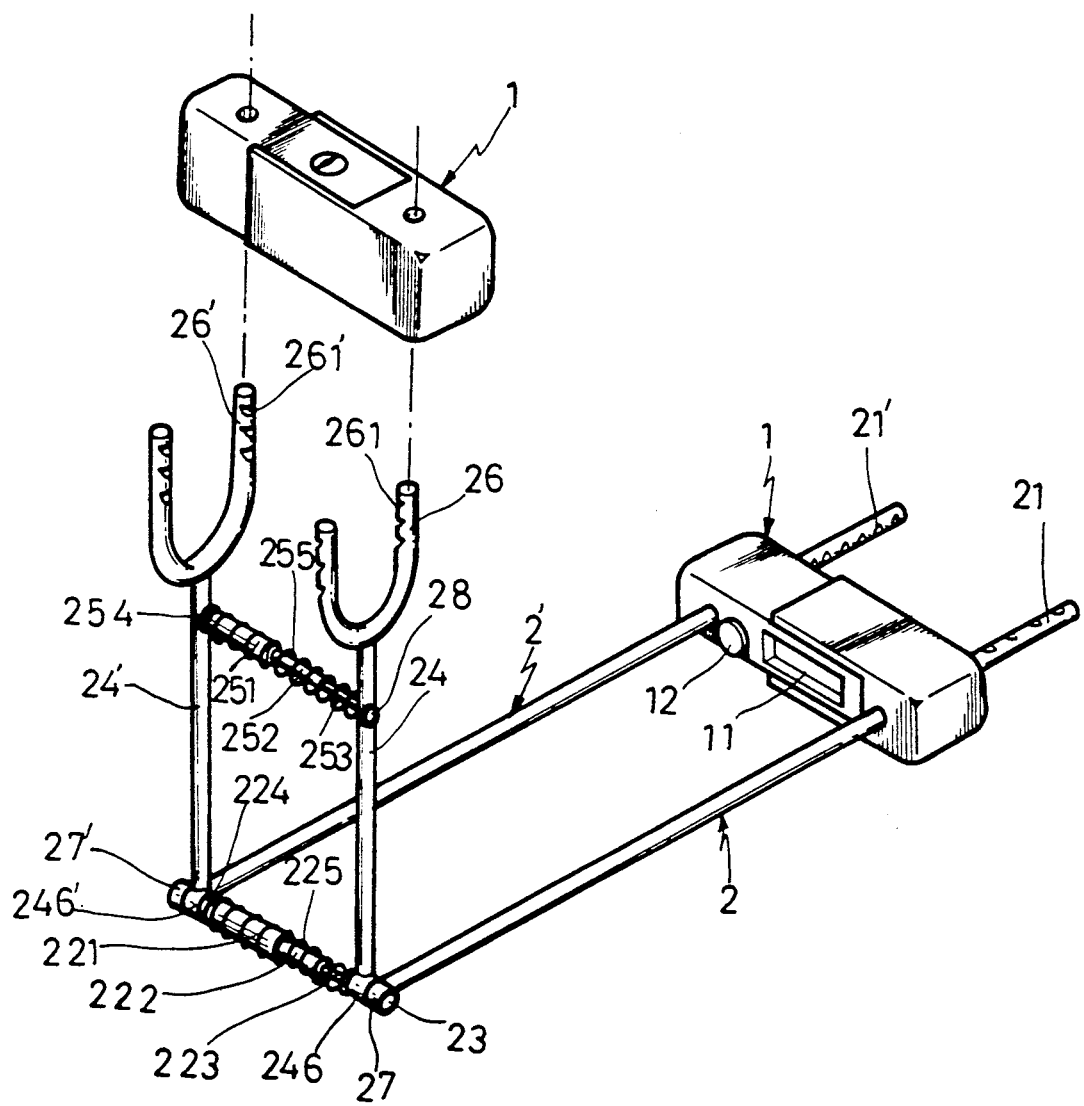
FIG. 5 illustrates a second preferred embodiment of a car steering lock of the present invention.

Referring to FIG. 5, therein illustrated is an alternate form of the present invention which has a structure similar to the afore-said first embodiment of the present invention with exception of the linked pair of fastening rods 24, 24'. In this embodiment, the linked pair of fastening rods 24, 24' each have a forked end 26 or 26' at the top. After the locking bars 2, 2' are locked on the steering post 3 of a car with the slot 11 or the button 12 stopped at the ignition switch, the steering wheel 31 is firmly retained by the forked ends 26, 26' of the linked pair of fastening rods 24, 24'.

Figure 6:
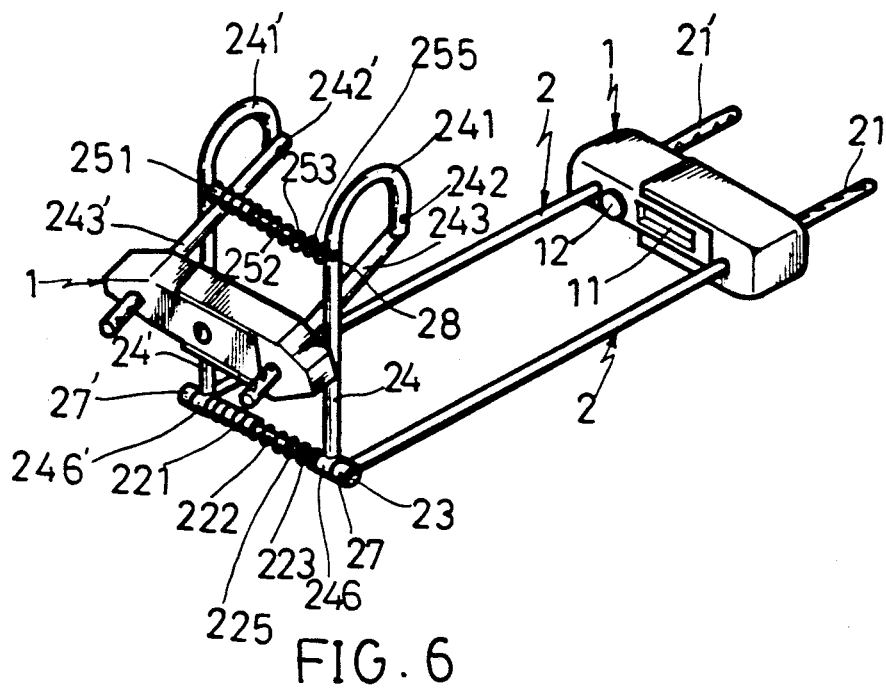
FIG. 6 illustrates a third preferred embodiment of a car steering lock of the present invention.
Figure 7:
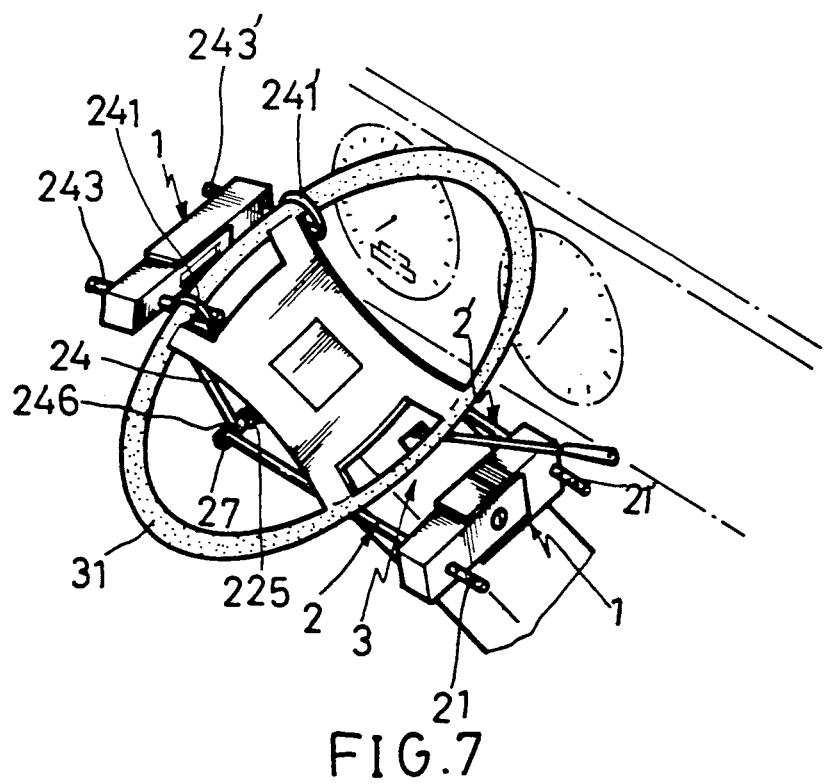
FIG. 7 illustrates the use of the third preferred embodiment of the car steering lock of the present invention in locking up a car steering wheel.
Figure 8:
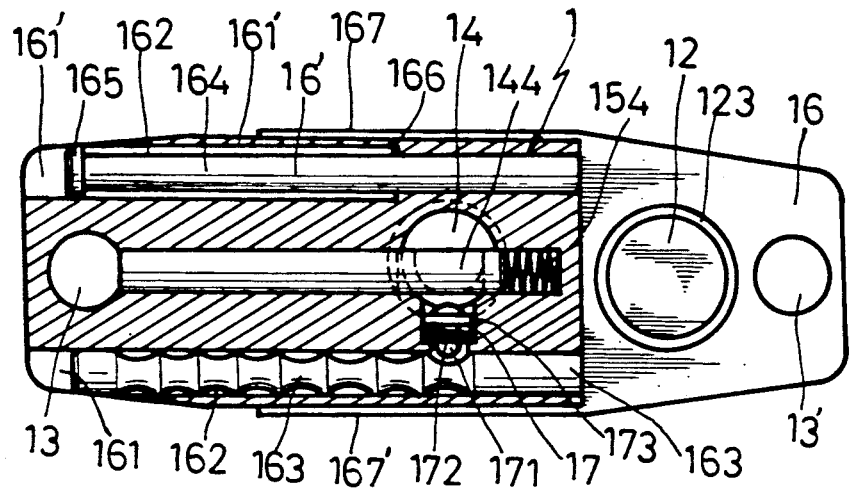
FIG. 8 is a transverse sectional view of a lock body according to the present invention.
Figure 9:
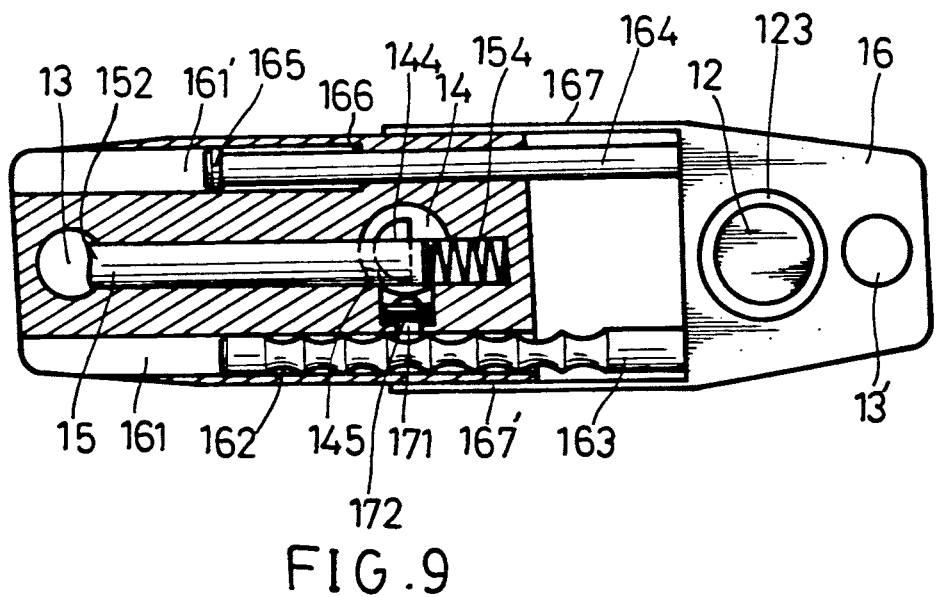
FIG. 9 is another transverse sectional view of the lock body according to the present invention.
Figure 10:
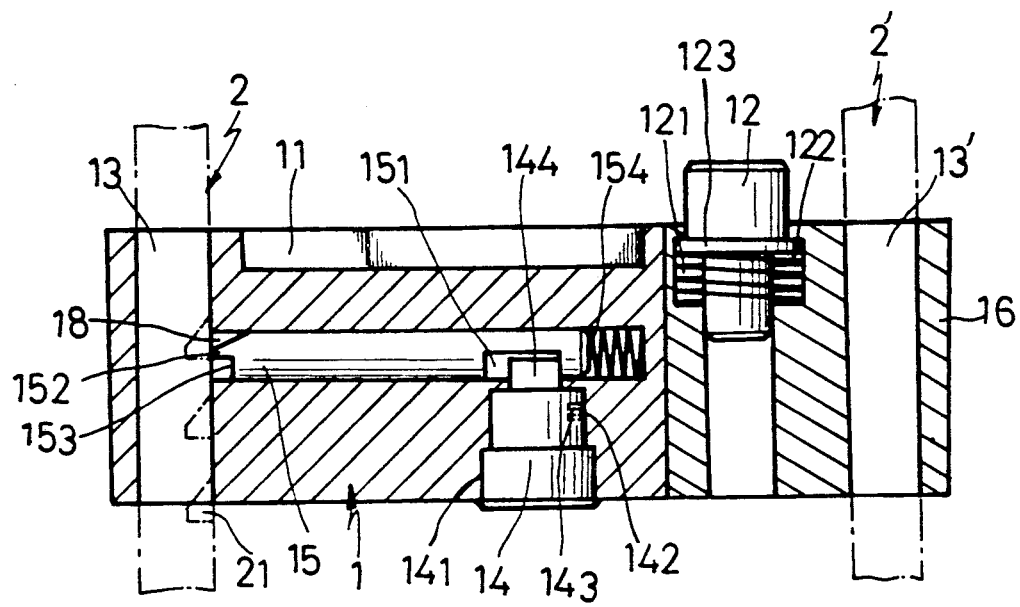
FIG. 10 is a longitudinal sectional view of the lock body according to the present invention.
Figure 11:
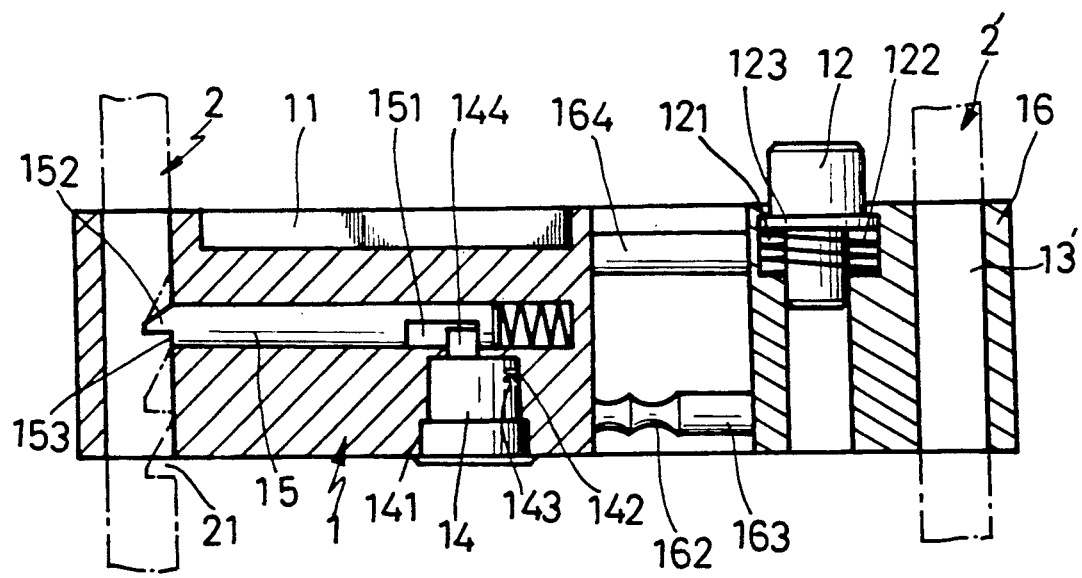
FIG. 11 is another longitudinal sectional view of the lock body according to the present invention.

Referring to FIGS. 6 and 7, therein illustrated is yet a further embodiment of the present invention, in which an additional lock body 1 is attached to the hooked ends 241, 241' of the linked pair of fastening rods 24, 24' of the afore-said first embodiment of the present invention for locking the steering wheel 31. As illustrated, the additional lock body 1 has a pair of locking bars 243, 243' respectively attached to the hooked ends 241, 241' of the linked pair of fastening rods 24, 24' by pins 242, 242' to match with the hooked ends 241, 241' for locking up the steering wheel 31.

Referring to FIGS. 8 through 11, a lock body 1 in accordance with the present invention comprises a circular recess 121 having a spring 122 received therein to support a button 12. The circular recess 121 contains a retainer 123 at the top thereof for securing the button 12 therein. By means of the effect of the spring 122 and the retainer 123, the button 12 is resiliently retained in the circular recess 121 for blocking any recessed type of ignition switch to protect against insertion of a pry bar. Inside the lock body 1 there is a lock barrel 14 (which is not within the scope of the basic teaching of the present invention and will not be detailed herein) controlled to simultaneously drive a first latch 15 and a second latch 163 into locking position. The lock barrel 14 has a notch 143 made thereon and is rotatably received in a circular seat 141 inside the lock body 1 and secured therein by a pin 142. There is a through-hole 17 made on the lock body 1 between the circular seat 141 and two locking holes 161, 161' for holding a control block 171, a spring 172 and a stop member 173. During rotary motion of the lock barrel 14, the control block 171 is simultaneously driven to protrude. Once the lock barrel 14 is turned back, the spring 172 forces the control block 171 to move in a groove 145. Therefore, once the control block 171 protrudes (in a locking mode) it is immediately forced to engage a notch 162 on the second latch 163 to lock up the second latch 163. The first latch 15 has a notch 151 thereon. When the lock barrel 14 is rotated, its top eccentric block 144 engages notch 151 to push the first latch 15 to move ahead, thus permitting the latch head 152 of the first latch 15 to insert in the locking bar 2. There is a spring 154 attached to the first latch 15 at the back and a notch 153 made on the latch head 152 so that the locking bars 2, 2' are permitted to insert downward into a locking position and are prevented from pulling out of the lock body 1. The second latch 163 is fastened in an extensible member 16 which forms a part of the lock body 1. The second latch 163 has a notch 162 into which the control block 171 is releasably fastened. There is also another latch 164 fastened in the extensible member 16 and having a retainer portion 165 at one end. Once the extensible member 16 is pulled to its limit, the retainer portion 165 is stopped at an inner flange 166 and therefore, the extensible member 16 is prevented from separating from the lock body 1. The first latch 15 is driven by the eccentric block 144 to move backward and urged by the spring 154 to move forward within an elongated hole 18 and controlled. After locking, the front end of the first latch 15 enters a notch 21 on the locking bar 2 to stop the locking bars 2, 2' from moving. When the locking bars 2, 2' are moved forward along locking direction (under locking mode), the spring 154 is squeezed backward permitting the locking bars 2, 2' and the lock body 1 to retain the steering post 3. Once the locking bars 2, 2' are pulled in reverse direction, they are prevented by the first latch 15 from moving backward. The notch 153 on the latch head 152 of the first latch 15 is not only designed for locking, it will make a clear sound when the locking bars 2, 2' are moved into locking position. There are protective cover boards 167, 167' attached to the extensible member 16 to protect against insertion of a tool in cutting the second latch 163 and prevent injury to fingers during operation.

Figure 12:
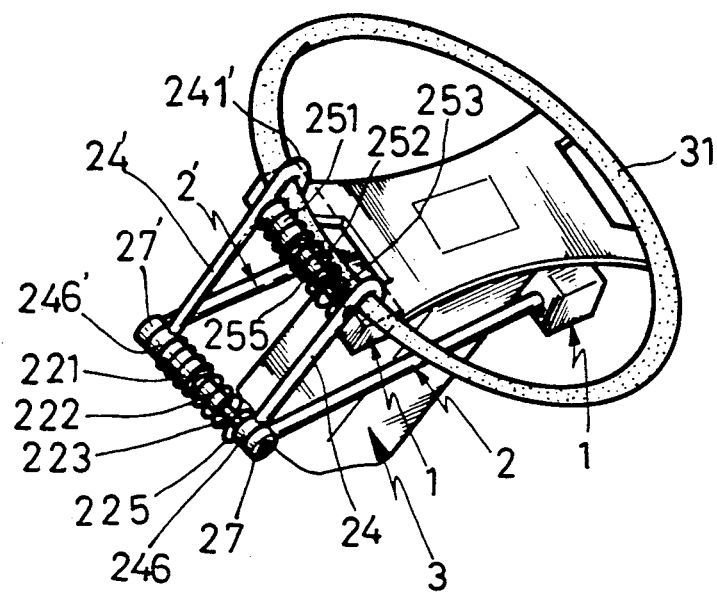
FIG. 12 is another drawing illustrating the use of the first preferred embodiment of the car steering lock of the present invention in locking up a car steering wheel.

Referring to FIGS. 1 and 12, the hooked ends 241, 241' of the linked pair of fastening rods 24, 24' each have at least one locking notch 245 or 245' at a suitable location for locking up the lock body 1 on the hooked ends 241, 241' and the locking bars 2, 2'. Referring to FIG. 5, the forked ends 26, 26' also each include at least one locking notch 261, 261' at a suitable location for locking up the lock body 1 thereon.

What is claimed is:

1. A steering lock with ignition switch blocking means comprising:
   a) a shackle including a pair of locking bars, a pair of fastening rods pivotally connected to the locking bars, a first telescopic tube connecting the locking bars in parallel, a second telescopic tube connecting the fastening rods in parallel, and engagement means carried at an end of each fastening rod for engaging a steering wheel;
   b) a lock body including a main portion and an extensible portion, a pair of locking holes extending transversely through the main and extensible portions whereby the spacing between the locking holes may be varied by extending and retracting the extensible portion relative to the main portion, the locking bars being slidably received through the locking holes, a spring-biased button for blocking a recessed ignition switch, and a slot for blocking a raised ignition switch;
   c) a first locking means carried by the lock body and including a spring-biased first latch, a second latch, a spring-biased control block, and a lock barrel including an eccentric block operable by a key to dispose the eccentric block into locking and unlocking positions; and
   d) whereby when the eccentric block is disposed in a locking position, the first latch engages the locking bar in the main portion to secure the lock body to the locking bars and the control block engages the second latch to secure the extensible portion and the main portion at a desired spacing between each other.

2. The steering lock of claim 1 wherein the engagement means at each end of the fastening rods includes a forked portion.

3. The steering lock of claim 1 wherein the engagement means at each end of the fastening rods includes a hooked portion.

4. The steering lock of claim 3 further including a pair of locking bars for attachment to the hooked portions to connect the fastening rods to the steering wheel.

5. The steering lock of claim 1 wherein the lock barrel further includes a first notch at one side thereof for controlling the movement of the control block, the first latch includes a second notch and the eccentric block being engageable within the second notch for disposing the first latch between locking and unlocking positions.

6. The steering lock of claim 1 further including two protective boards attached to opposite sides of the extensible portion for covering a gap formed between the main and extensible portions when the extensible portion is extended from the main portion.

7. The steering lock of claim 1 further including a second locking means detachably engageable with the means for engaging the steering wheel to lock the ends of the fastening rods to the steering wheel.

8. The steering lock of claim 1 wherein each locking bar is pivotally connected to its fastening rod by cooperating toothed means for preventing relative pivotal movement between the bar and rod.

9. The steering lock of claim 1 wherein the first and second telescopic tubes each includes a compression spring sleeved thereon for urging the locking bars and fastening rods apart from each other.

10. The steering lock of claim 1 wherein the first and second telescopic tubes each include a first section, at least one intermediate section, and a last section, the sections being of decreasing diameter to permit the sections to be telescopically received one within the other, the first section having the largest diameter and provided with a plurality of internal sliding grooves, the last section having the smallest diameter and provided with a plurality of guide blocks, the at least one intermediate section being provided with both a plurality of guide blocks and a plurality of internal sliding grooves, and the guide blocks being slidably receivable within the sliding grooves.

* * * * *